May 20, 1958
W. SCHWARTZKOPF
2,835,065
FISHING ROD HOLDER
Filed Aug. 10, 1956
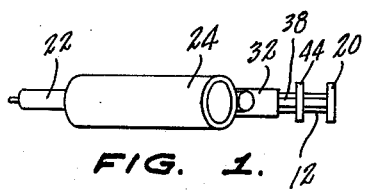
FIG. 1.
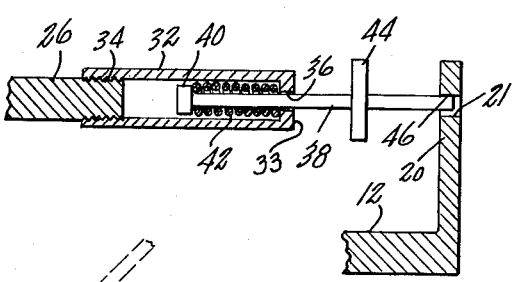
FIG. 4.
FIG. 2.
FIG. 3.
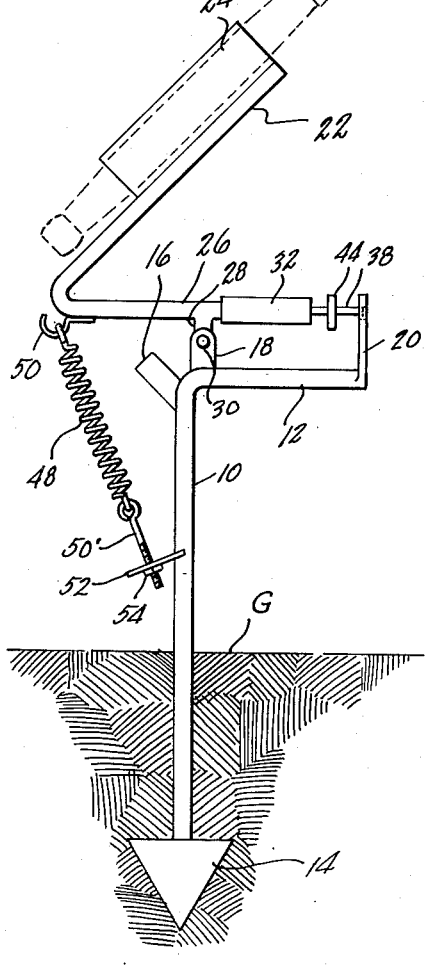
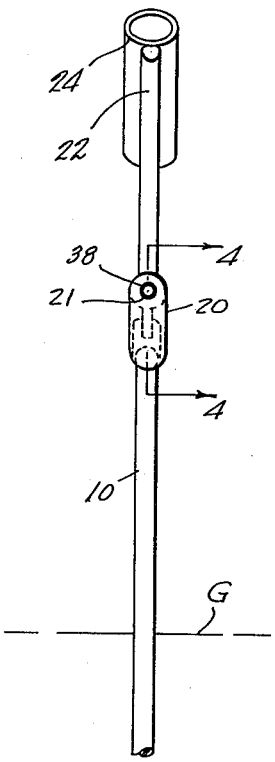
INVENTOR.
WILLIAM SCHWARTZKOPF,
BY
McMorrow, Berman & Davidson
ATTORNEYS.

United States Patent Office 2,835,065
Patented May 20, 1958

2,835,065

FISHING ROD HOLDER

William Schwartzkopf, Torrington, Wyo.

Application August 10, 1956, Serial No. 603,308

4 Claims. (Cl. 43—15)

This invention relates to a fishing rod holder of the type adapted to be triggered when the fish strikes the bait, to release a mechanism that snaps the rod rearwardly, to set the hook in the fish's mouth.

The main object of the present invention is to provide a generally improved device of the type referred to.

More specific objects are to provide a device as stated which is capable of being made more cheaply than previous devices conceived along the same line; will have a simple triggering mechanism utilizing a frictional contact between a portion of the swingable rod support assembly and an associated standard, operating counter to the force of a contractile spring in such a manner as to normally keep the spring from snapping the rod backwardly, while at the same time assuring that the rod will be so snapped in a rearward direction whenever the pull on the line by a fish is sufficiently great as to lower the frictional contact below a predetermined value.

Other objects will appear from the following description, the claims appended thereto, and from the annexed drawing, in which like reference characters designate like parts throughout the several views, and wherein:

Figure 1 is a top plan view of a fishing rod holder formed according to the present invention;

Figure 2 is a side elevational view in which the supported rod has been illustrated fragmentarily, in dotted outline;

Figure 3 is a front elevational view of the device as seen from the right of Figure 2; and Figure 4 is an enlarged detail sectional view on line 4—4 of Figure 3.

A standard 10, formed of solid iron rod material or the like, is integral at its upper end with a forwardly projecting relatively short, horizontally disposed extension 12, and at its lower end has a triangular ground anchor or point 14 adapted to be embedded in the ground G to maintain the post in an upright position within the ground.

Adjacent the intersection of the standard 10 and extension 12, there is provided an inclined abutment 16 projecting upwardly, outwardly from the standard at approximately 45 degrees from the vertical. Immediately in front of the abutment 16 there are provided upstanding laterally spaced pivot brackets 18, and at the free end of the extension 12 there is formed an upwardly projecting portion 20 having adjacent its upper end an opening 21. A rod support arm 22 has secured thereto a sleeve 24 receiving the butt of a fishing rod R. Arm 22 is inclined from the vertical, in its normal position shown in Figure 2, to the extent of approximately 45 degrees, and is integral at its lower end with a horizontally disposed rock bar 26 integrally formed intermediate its ends with a depending finger 28 pivotally connected at 30 between the brackets 18. The bar 26, as shown in Figure 4, is threaded at its forward end, for engaging complementary threads 34 formed in the open end of a plunger housing 32. The housing 32 at its other end 33 is closed, and the closed end 33 of the plunger housing has a center opening 36 in which is slidable a plunger 38. Plunger 38 within the housing 32 has a head 40, and held under compression between the head 40 and the end wall of the plunger housing 32 is a spring 42.

A collar 44 is fixedly secured to the plunger 38 exteriorly of the housing 32, constituting a means for grasping the plunger for the purpose of pulling the same outwardly of the housing against the restraint of the spring 42.

In use of the device, the rod R is supported in the sleeve 24 in the manner illustrated in Figure 2, and the plunger is pulled outwardly for engagement of the free end thereof within the opening 21. As will be noted, the opening 21 is somewhat greater in diameter than the diameter of the plunger 38. A contractile spring 48 is connected at one end to a hook 50 secured to the rock bar 26 adjacent the intersection of the rock bar with the rod support arm 22. At its other end, spring 48 is connected to an eye bolt 50', passing through a plate 52 secured to and projecting laterally, outwardly from standard 10, a nut 54 being threaded on the eye bolt against the under side of the plate 52, for the purpose of adjusting the tension of the spring 48.

The spring, tending to contract, normally tends to swing the arm 22 and the bar 26 in a counterclockwise direction, viewing the same as in Figure 2, about the pivot axis 30. However, the spring is prevented from doing this by reason of the fact that the plunger 38 is engaged in the opening 21. Spring 42 is held under compression when plunger 38 is so engaged, but does not expand due to the fact that frictional engagement between plunger 38 and the wall of opening 21 is greater than the expanding force of the spring 42. The friction between the plunger 38 and the wall of opening 21, of course, is increased substantially by reason of the fact that there is a strong pull exerted on the opposite end of the rock bar by the contractile spring 48, tending to shift the plunger 38 upwardly in Figure 4, causing the same to bear tightly against the wall of opening 21.

When a fish strikes the bait, it tends to exert a pull on the fishing line, as a result of which the rod R is swung to the right in Figure 2. This causes the bar 26 to pivot in a clockwise direction about the axis 30 to a slight extent. The slight extent of pivotal movement of the rock bar is just sufficient to reduce the frictional engagement between plunger 38 and the wall of opening 21 sufficiently to permit expansion of spring 42. Spring 42, expanding, retracts the plunger so as to free the plunger from engagement with the portion 20 of the support frame. As a result, spring 48 is now free to contract, and when it does contract, swings the rock bar in a counterclockwise direction about pivot 30 to a substantial extent, snapping the rod R rearwardly and setting the hook in the fish's mouth.

Swinging movement of the rod and the V-shaped support assembly therefor is limited, of course, by the stop 16, which is disposed at the path of said swinging movement. Accordingly, the rod will be disposed substantially straight upwardly at the end of its movement, permitting the user to lift the same out of the socket 24 for the purpose of playing the hooked fish.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any

I claim:

1. A fishing rod holder comprising a support including an upwardly projecting portion having an opening; a rod support arm including a rod-receiving socket; a rock bar rigid with said arm and fulcrumed upon said support; a spring connected between the rock bar and said support under tension effective to normally bias the rod support arm in one direction about its pivot axis; a plunger slidable in said rock bar and projecting beyond one end of the rock bar for engagement in said opening; a second spring associated with the plunger and tensioned to normally retract the plunger out of said opening, said opening being greater in diameter than that of the plunger, for permitting limited pivotal movement of the rock bar with the plunger engaged in said opening, under a pull exerted on a rod by a fish, said plunger being frictionally engaged with the wall of the opening responsive to pull exerted on the rock bar by the first named spring tending to swing the rock bar about the pivot axis in said one direction, the frictional engagement between the plunger and opening being reduced responsive to the exertion of pull upon a rod by a fish, to free the second spring for expansion, whereby to retract the plunger and free the rock bar and arm for movement about said pivot axis.

2. A fishing rod holder comprising a support including an upwardly projecting portion having an opening; a rod support arm including a rod-receiving socket; a rock bar rigid with said arm and fulcrumed upon said support; a spring connected between the rock bar and said support under tension effective to normally bias the rod support arm in one direction about its pivot axis; a plunger slidable in said rock bar and projecting beyond one end of the rock bar for engagement in said opening; a second spring associated with the plunger and tensioned to normally retract the plunger out of said opening, said opening being greater in diameter than that of the plunger, for permitting limited pivotal movement of the rock bar with the plunger engaged in said opening, under a pull exerted on a rod by a fish, said plunger being frictionally engaged with the wall of the opening responsive to pull exerted on the rock bar by the first named spring tending to swing the rock bar about the pivot axis in said one direction, the frictional engagement between the plunger and opening being reduced responsive to the exertion of pull upon a rod by a fish, to free the second spring for expansion, whereby to retract the plunger and free the rock bar and arm for movement about said pivot axis, said rock bar and rod support arm being fixedly connected in divergent relation, to provide a V-shaped assembly fulcrumed upon said support.

3. A fishing rod holder comprising a support including an upwardly projecting portion having an opening; a rod support arm including a rod-receiving socket; a rock bar rigid with said arm and fulcrumed upon said support; a spring connected between the rock bar and said support under tension effective to normally bias the rod support arm in one direction about its pivot axis; a plunger slidable in said rock bar and projecting beyond one end of the rock bar for engagement in said opening; a second spring associated with the plunger and tensioned to normally retract the plunger out of said opening, said opening being greater in diameter than that of the plunger, for permitting limited pivotal movement of the rock bar with the plunger engaged in said opening, under a pull exerted on a rod by a fish, said plunger being frictionally engaged with the wall of the opening responsive to pull exerted on the rock by the first named spring tending to swing the rock bar about the pivot axis in one direction, the frictional engagement between the plunger and opening being reduced responsive to the exertion of pull upon a rod by a fish, to free the second spring for expansion, whereby to retract the plunger and free the rock bar and arm for movement about said pivot axis, said rock bar and rod support arm being fixedly connected in divergent relation, to provide a V-shaped assembly fulcrumed upon said support, said support including a stop extending in the path of pivotal movement of the rock bar, to limit swinging movement of the rock bar under the force of the first named spring.

4. A fishing rod holder comprising a support including an upwardly projecting portion having an opening; a rod support arm including a rod-receiving socket; a rock bar rigid with said arm and fulcrumed upon said support; a spring connected between the rock bar and said support under tension effective to normally bias the rod support arm in one direction about its pivot axis; a plunger slidable in said rock bar and projecting beyond one end of the rock bar for engagement in said opening; a second spring associated with the plunger and tensioned to normally retract the plunger out of said opening, said opening being greater in diameter than that of the plunger, for permitting limited pivotal movement of the rock bar with the plunger engaged in said opening, under a pull exerted on a rod by a fish, said plunger being frictionally engaged with the wall of the opening responsive to pull exerted on the rock bar by the first named spring tending to swing the rock bar about the pivot axis in said one direction, the frictional engagement between the plunger and opening being reduced responsive to the exertion of pull upon a rod by a fish, to free the second spring for expansion, whereby to retract the plunger and free the rod bar and arm for movement about said pivot axis, said rock bar and rod support arm being fixedly connected in divergent relation to provide a V-shaped assembly fulcrumed upon said support, said support including a stop extending in the path of pivotal movement of the rock bar, to limit swinging movement of the rock bar under the force of the first named spring, said rock bar including at one end a cylindrical housing, said housing having an end wall formed with an aperture and said plunger being slidably engaged in the last named opening, the spring associated with the plunger being extended within said housing and said plunger being formed, within the housing, with an enlargement, said second named spring being held under compression between said enlargement and the apertured end wall of the housing.

References Cited in the file of this patent

UNITED STATES PATENTS

| | | |
|---|---|---|
| 2,618,090 | Kimura | Nov. 18, 1952 |
| 2,784,517 | Mooney | Mar. 12, 1957 |